US011022835B2

United States Patent
Jamali et al.

(10) Patent No.: US 11,022,835 B2
(45) Date of Patent: Jun. 1, 2021

(54) OPTICAL SYSTEM USING SEGMENTED PHASE PROFILE LIQUID CRYSTAL LENSES

(71) Applicant: Facebook Technologies, LLC, Menlo Park, CA (US)

(72) Inventors: Afsoon Jamali, Menlo Park, CA (US); Wanli Chi, Menlo Park, CA (US); Douglas Lanman, Menlo Park, CA (US)

(73) Assignee: FACEBOOK TECHNOLOGIES, LLC, Menlo Park, CA (US)

( * ) Notice: Subject to any disclaimer, the term of this patent is extended or adjusted under 35 U.S.C. 154(b) by 0 days.

(21) Appl. No.: 16/261,552

(22) Filed: Jan. 29, 2019

(65) Prior Publication Data

US 2020/0192152 A1 Jun. 18, 2020

Related U.S. Application Data

(60) Provisional application No. 62/780,202, filed on Dec. 15, 2018.

(51) Int. Cl.
*G06T 19/00* (2011.01)
*G02F 1/1335* (2006.01)
(Continued)

(52) U.S. Cl.
CPC ... *G02F 1/133526* (2013.01); *G02B 27/0093* (2013.01); *G02B 27/0172* (2013.01);
(Continued)

(58) Field of Classification Search
CPC ............... G06F 3/013; G02F 1/133526; G02F 2001/294; G02B 27/0093
See application file for complete search history.

(56) References Cited

U.S. PATENT DOCUMENTS

2007/0183293 A1* 8/2007 Murata ..................... G02F 1/29
369/112.02
2010/0225834 A1 9/2010 Li
(Continued)

FOREIGN PATENT DOCUMENTS

WO 2016187715 A1 12/2016

OTHER PUBLICATIONS

Jamali, A., et. al. "Design of Large Aperture Tunable Refractive Fresnel Liquid Crystal Lens," Applied Optics, 57(7):B10, Mar. 2018, also available at URL: https://www.researchgate.net/publication/320630387_Design_of_a_large_aperture_tunable_refractive_Fresnel_liquid_crystal_lens, retrieved on Dec. 5, 2018, 11 pages.
(Continued)

*Primary Examiner* — Yuzhen Shen
(74) *Attorney, Agent, or Firm* — Millburn IP PLLC

(57) ABSTRACT

An optical system is provided. The optical system includes an electronic display, an adaptive lens assembly, and an eye tracking device. The electronic display displays a virtual scene for a user of the optical system; the adaptive lens assembly is optically coupled to the electronic display between the electronic display and eyes of the user; and the eye tracking device provides eye tracking information of the eyes of the user. The adaptive lens assembly includes a plurality of adjustable liquid crystal (LC) lenses arranged in an array, and the adjustable LC lenses are activated individually based on the eye tracking information.

20 Claims, 10 Drawing Sheets

(51) Int. Cl.
*G06F 3/01* (2006.01)
*G02B 27/01* (2006.01)
*G02B 27/00* (2006.01)

(52) U.S. Cl.
CPC ............ *G06F 3/013* (2013.01); *G06T 19/006* (2013.01); *G02B 2027/014* (2013.01)

(56) References Cited

U.S. PATENT DOCUMENTS

| | | | | |
|---|---|---|---|---|
| 2013/0235002 | A1* | 9/2013 | Chiang | G09G 3/2025 345/204 |
| 2014/0152926 | A1* | 6/2014 | Takahashi | G02F 1/13306 349/15 |
| 2015/0249818 | A1* | 9/2015 | Murao | G02B 30/27 348/59 |
| 2016/0041449 | A1* | 2/2016 | Clark | G02F 1/134309 623/6.56 |
| 2017/0160798 | A1* | 6/2017 | Lanman | G02B 27/0172 |
| 2017/0184848 | A1 | 6/2017 | Vallius | |
| 2018/0107056 | A1* | 4/2018 | Park | G02B 3/14 |
| 2018/0275394 | A1 | 9/2018 | Yeoh et al. | |
| 2019/0278152 | A1* | 9/2019 | Wang | G02F 1/29 |

OTHER PUBLICATIONS

Jamali, A., et. al. "LC lens systems to solve accommodation/convergence conflict in three-dimensional and virtual reality displays," Optical Engineering, 57(10), 105101 (2018), retrieved on the Internet from URL: https://www.spiedigitallibrary.org/journals/Optical-Engineering/volume-57/issue-10/105101/LC-lens-systems-to-solve-accommodation-convergence-conflict-in-three/10.1117/1.OE.57.10.105101.full; retrieved on Jul. 10, 2020 (9 pages).
International Search Report and Written Opinion dated Sep. 11, 2019, in International Application No. PCT/US2019/015929, filed on Jan. 30, 2019 (10 pages).

* cited by examiner (Real World)

(3D Display)

800

- 810 — Determining a position and an orientation of a head-mounted display (HMD) worn by a user
- 820 — Determining a virtual scene based on the determined position and orientation of the HMD
- 830 — Displaying the determined position of the virtual scene on an electronic display of the HMD
- 840 — Determining an eye position for each eye of the user using an eye tracking system
- 850 — Determining the optical power of the HMD based on the virtual scene and the eye position
- 860 — Determining configurations of the SPP LC lenses based on the optical power and the eye position
- 870 — Adjusting the SPP LC lenses based on the determined configurations
- 880 — Adjusting the virtual scene based on the position of activated SPP LC lenses

FIG. 8

OPTICAL SYSTEM USING SEGMENTED PHASE PROFILE LIQUID CRYSTAL LENSES

CROSS-REFERENCES TO RELATED APPLICATIONS

This application claims priority to U.S. provisional Patent Application No. 62/780,202, filed on Dec. 15, 2018, contents of which are hereby incorporated by reference in its entirety.

BACKGROUND

Virtual reality (VR) headsets can be used to simulate virtual environments. For example, stereoscopic images can be displayed on an electronic display inside a headset to simulate the illusion of depth, and head tracking sensors can be used to estimate what portion of the virtual environment is being viewed by the user. However, because existing headsets are often unable to correctly render or otherwise compensate for vergence and accommodation conflicts, such simulation can cause visual fatigue and nausea of the users.

Augmented Reality (AR) headsets display a virtual image overlapping with real-world images. To create comfortable viewing experience, the virtual image generated by the AR headsets needs to be displayed at the right distance for the eye accommodations of the real-world images in real time during the viewing process.

BRIEF SUMMARY OF THE DISCLOSURE

One aspect of the present disclosure provides an optical system. The optical system includes an electronic display, an adaptive lens assembly, and an eye tracking device. The electronic display displays a virtual scene for a user of the optical system; the adaptive lens assembly is optically coupled to the electronic display between the electronic display and eyes of the user; and the eye tracking device provides eye tracking information of the eyes of the user. The adaptive lens assembly includes a plurality of adjustable liquid crystal (LC) lenses arranged in an array, and the adjustable LC lenses are activated individually based on the eye tracking information.

Another aspect of the present disclosure provides an adaptive lens assembly system. The adaptive lens assembly system includes an eye tracking device providing eye tracking information of eyes of a user, and a plurality of adjustable liquid crystal (LC) lenses arranged in an array. The adjustable LC lenses are activated individually based on the eye tracking information.

Other aspects of the present disclosure can be understood by those skilled in the art in light of the description, the claims, and the drawings of the present disclosure.

BRIEF DESCRIPTION OF THE DRAWINGS

FIG. 8 illustrates an exemplary adaptive lens assembly adjusting process according to the present disclosure.

DETAILED DESCRIPTION

Vergence-accommodation conflict is a problem in many virtual reality systems. Vergence is the simultaneous movement or rotation of both eyes in opposite directions to obtain or maintain single binocular vision and is connected to accommodation of the eye. Under normal conditions, when human eyes look at a new object at a distance different from an object they had been looking at, the eyes automatically change focus (by changing their shape) to provide accommodation at the new distance or vergence distance of the new object.

Figure 1A:
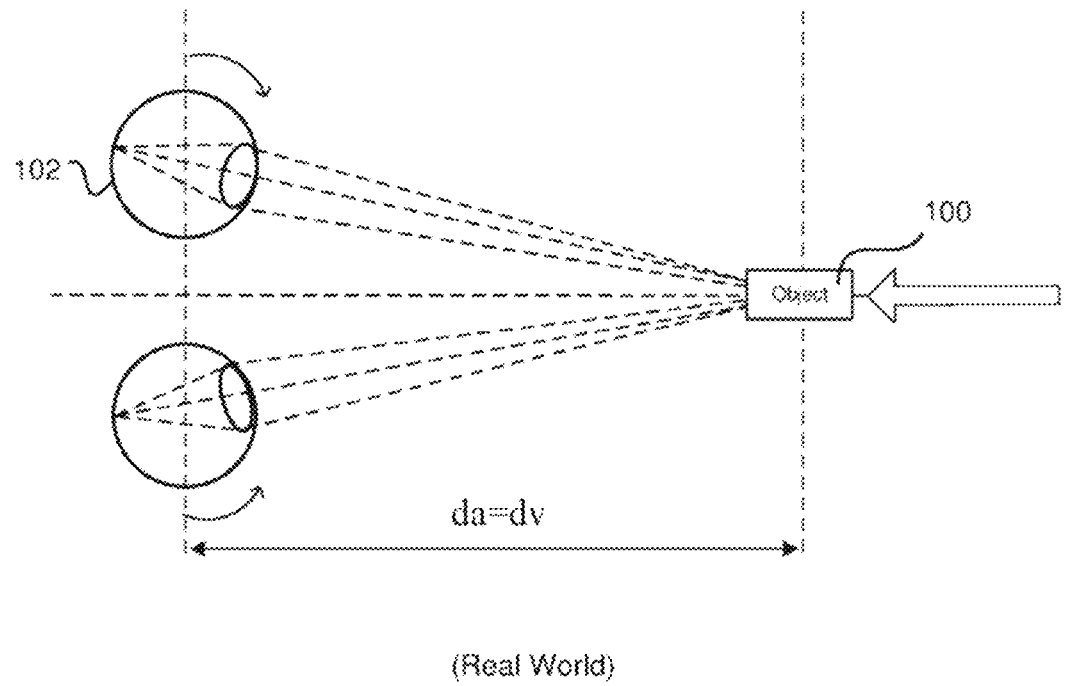
FIG. 1A illustrates a relationship between vergence and eye focal length in the real world.

FIG. 1A shows an example of how the human eye experiences vergence and accommodation in the real world. As shown in FIG. 1A, the user is looking at a real object 100 (i.e., the user's eyes are verged on the real object 100 and gaze lines from the user's eyes intersect at real object 100). As the real object 100 is moved closer to the user, as indicated by the arrow in FIG. 1A, each eye 102 rotates inward (i.e., convergence) to stay verged on the real object 100. As the real object 100 gets closer, the eye 102 must "accommodate" for the closer distance by changing its shape to reduce the power or focal length. The distance to which the eye must be focused to create a sharp retinal image is the accommodative distance. Thus, under normal conditions in the real world, the vergence distance ($d_v$) is equal to the accommodative distance ($d_a$).

Figure 1B:
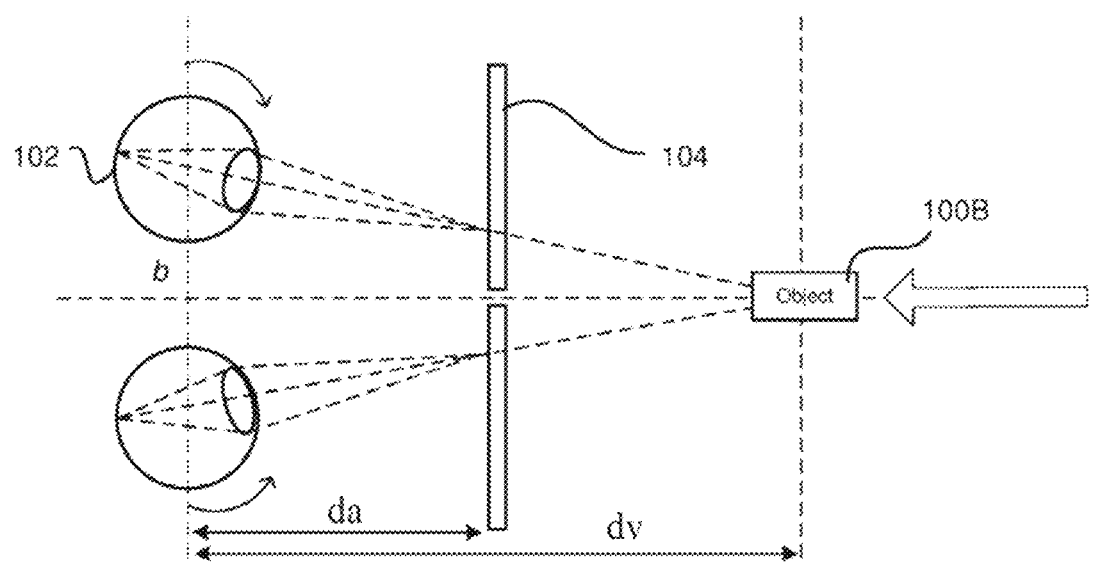
FIG. 1B illustrates a conflict between vergence and eye focal length in a three-dimensional (3D) display screen.

FIG. 1B shows an example conflict between vergence and accommodation that can occur with some three-dimensional displays. As shown in FIG. 1B, a user is looking at a virtual object 100B displayed on an electronic screen 104. However, the user's eyes are verged on and gaze lines from the user's eyes intersect at virtual object 100B, which is a greater distance from the user's eyes than the electronic screen 104. As the virtual object 100B is rendered on the electronic display 104 to appear closer to the user, each eye 102 again rotates inward to stay verged on the virtual object 100B, but the power or focal length of each eye is not reduced; hence, the user's eyes do not accommodate as in FIG. 1A. Thus, instead of reducing power or focal length to accommodate for the closer vergence distance, each eye 102 maintains accommodation at a distance associated with the electronic display 104. Thus, the vergence distance ($d_v$) often is not equal to the accommodative distance ($d_a$) for the human eye for objects displayed on 2D electronic displays. This discrepancy between vergence distance ($d_v$) and accommodative distance ($d_a$) is referred to as "vergence-accommodation conflict." A user who is experiencing only vergence or accommodation but not both will eventually experience some degree of fatigue and nausea, which is undesirable for virtual reality system creators.

Figure 2A:
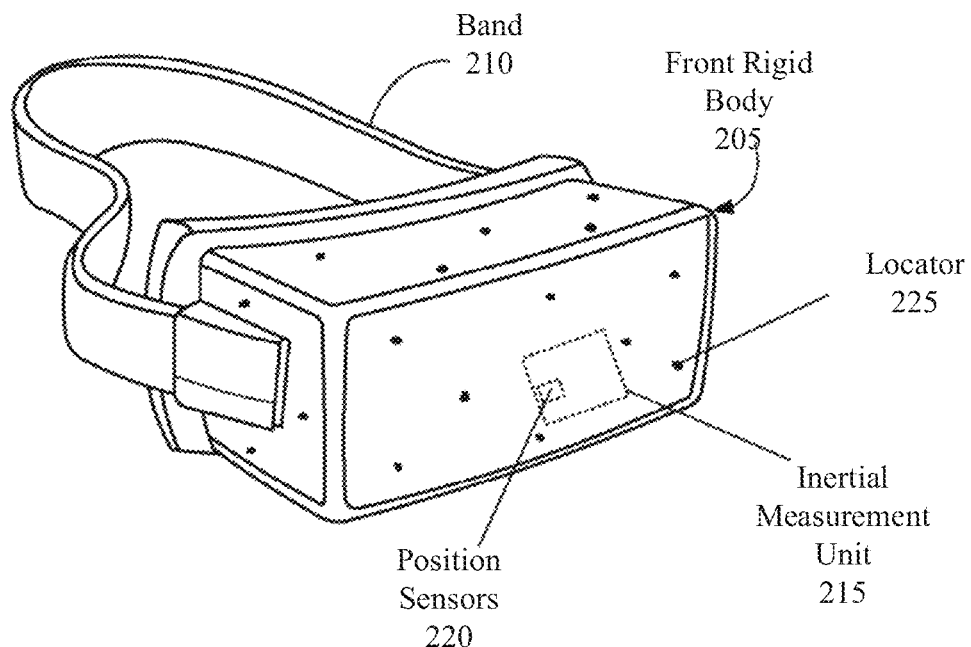
FIG. 2A illustrates a wire diagram of an example head-mounted display (HMD) according to the present disclosure.

FIG. 2A illustrates a wire diagram of an example head-mounted display (HMD) 200, in accordance with an embodiment of the present disclosure. As shown in FIG. 2A, the HMD 200 may include a front rigid body 205 and a band 710. The front rigid body 205 may include one or more electronic display elements of an electronic display (not shown), an inertial measurement unit (IMU) 215, one or more position sensors 220, and locators 225. In the embodiment shown by FIG. 2A, the position sensors 220 may be located within the IMU 215, and neither the IMU 215 nor the position sensors 220 may be visible to the user. The IMU 215, the position sensors 220, and the locators 225 may be discussed in detail below with regard to FIG. 7. The HMD 200 acts as a virtual reality (VR) device, an augmented reality (AR) device or a mixed reality (MR) device, or some combination thereof. In some embodiments, when the HMD 200 acts as an augmented reality (AR) or a mixed reality (MR) device, portions of the HMD 200 and its internal components may be at least partially transparent.

Figure 2B:
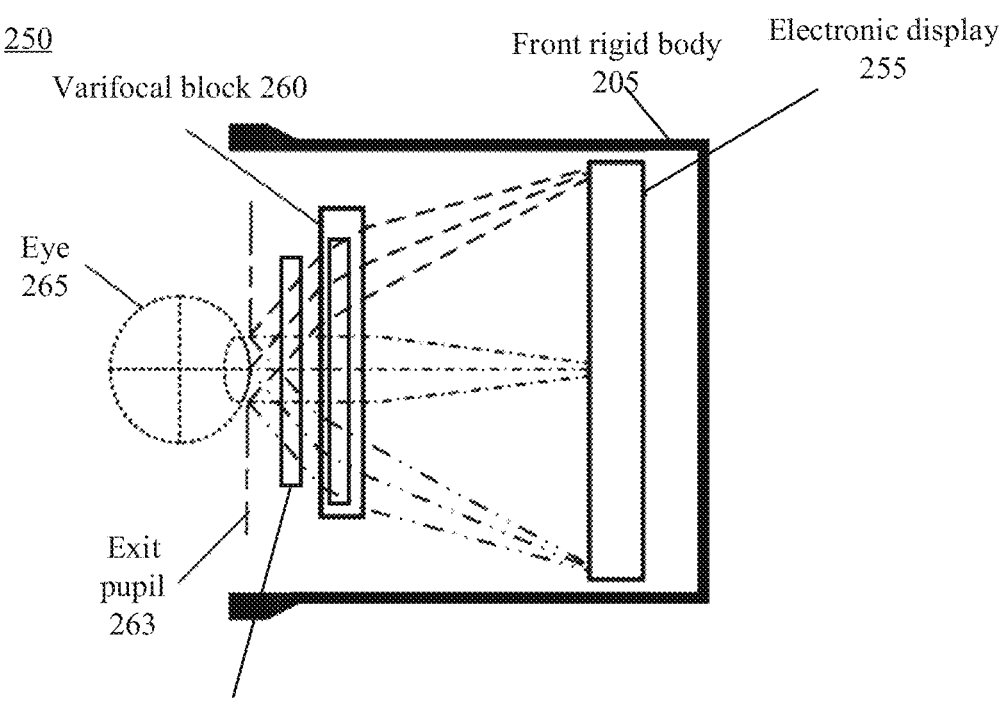
FIG. 2B illustrates a cross-section of a front rigid body of the HMD in FIG. 2A according to the present disclosure.

FIG. 2B is a cross section 250 of the front rigid body 205 of the embodiment of the HMD 200 shown in FIG. 2A. As shown in FIG. 2B, the front rigid body 205 may include an electronic display 255, a varifocal block 260 and an eye tracking system 270. The electronic display 255 may display images (i.e., virtual scenes) to the user. In some embodiments, the electronic display 255 may include a stack of one or more waveguide displays 275 including, but not limited to, a stacked waveguide display. The varifocal block 260 may include one or more varifocal structures in optical series. A varifocal structure is an optical device that is configured to dynamically adjust its focus in accordance with instructions from a varifocal system. The electronic display 255 and the varifocal block 260 together provide image light to an exit pupil 263. The eye tracking system 270 may include, e.g., one or more sources that illuminate one or both eyes of the user, and one or more cameras that captures images of one or both eyes of the user. The eye tracking system 270 may detect a location or an object in the virtual scene at which the user's eye 265 is currently looking. The exit pupil 263 may be the location of the front rigid body 205 where a user's eye 265 is positioned. For purposes of illustration, FIG. 2B shows a cross section 250 associated with a single eye 265, but another varifocal block, which is separated from the varifocal block 260, may provide altered image light to another eye of the user.

Optical series refers to relative positioning of a plurality of optical elements, such that light, for each optical element of the plurality of optical elements, is transmitted by that optical element before being transmitted by another optical element of the plurality of optical elements. Moreover, ordering of the optical elements does not matter. For example, optical element A placed before optical element B, or optical element B placed before optical element A, are both in optical series. Similar to electric circuitry design, optical series represents optical elements with their optical properties compounded when placed in series.

Figure 3:
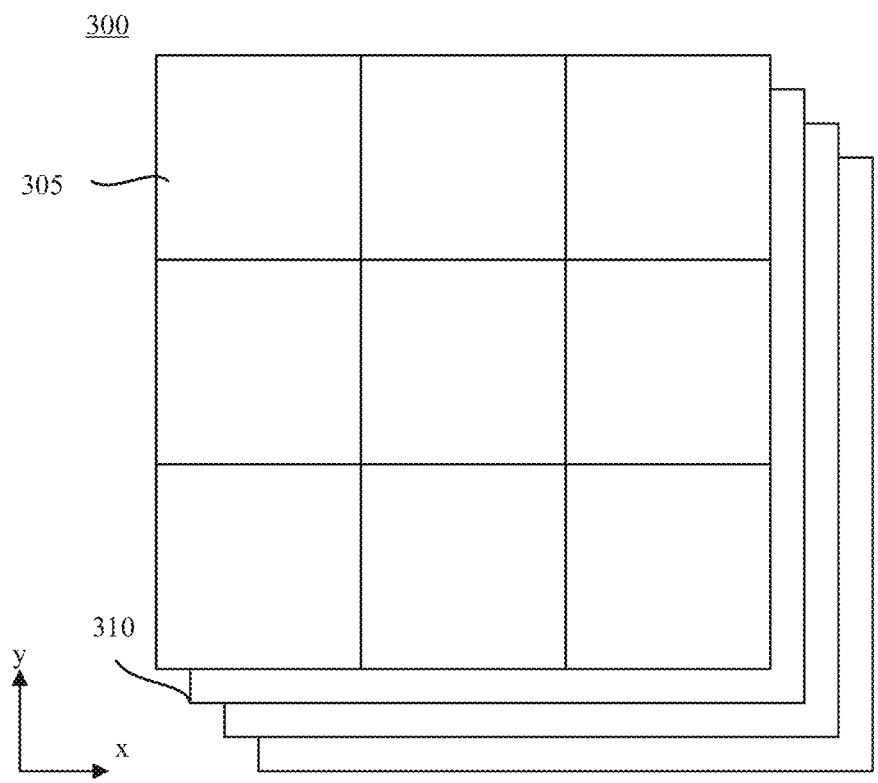
FIG. 3 illustrates an exemplary varifocal structure according to the present disclosure.

FIG. 3 illustrates an exemplary varifocal structure according to the present disclosure. As shown in FIG. 3 and FIG. 2B, the varifocal structure may include an adaptive lens assembly 300, which may include a plurality of optical lenses 305 arranged in an array or any appropriate geometric formation. The adaptive lens assembly 300 may have a length along the x-axis or horizontal direction and a width along the y-axis or vertical direction.

The plurality of optical lenses 305 may be coupled together to form the adaptive lens assembly 300. For example, the plurality of optical lenses 305 may be individual lenses coupled together through mechanical and/or electrical means, such that the plurality of optical lenses 305 may be controlled individually and independently. In certain embodiments, the plurality of optical lenses 305 may be integrated together during fabrication to form a uniform lens. That is, the plurality of optical lenses 305 may be formed at the same time and in the same process as an integral lens array. Other arrangements may also be used.

The optical lens 305 may include any appropriate lens units, such as a glass lens, a polymer lens, a liquid lens, a liquid crystal (LC) lens, or some combination thereof. The optical lens 305 may adjust an orientation of light emitted from the electronic display 255, such that the light emitted from the electronic display 255 appears at particular focal distances/image planes from the user. In certain embodiments, the optical lens 305 may be an LC lens, which is capable of adjusting the optical power sufficiently fast to keep pace with eye accommodation (e.g., accommodation occurs in around 300 ms), such that the vergence-accommodation conflict can be resolved.

In some embodiments, each optical lens 305 may include a plurality of layers of lens units, each of the layers of lens unit may be referred as a lens layer 310. That is, each optical lens 305 may include at least two lens layers 310, and each layer has a lens unit. The plurality of lens units (i.e., lens layers) may be stacked together to form the optical lens 305, and the total optical power of the optical lens 305 may be a sum of the optical power of the plurality of lens units. Then the plurality of optical lenses 305 may be coupled together to form the adaptive lens assembly 300. In some embodiments, the plurality of lens units (i.e., lens layers) which are stacked together to form the optical lens 305 may be individually controlled. For example, when adjusting the focal length of the adaptive lens assembly, certain lens units may be activated while certain lens units may be deactivated, and the activated lens units may be configured to have same or different optical power. In some embodiments, the plurality of lens units (i.e., lens layers) which are stacked together to form the optical lens 305 may be integrally controlled. For example, when adjusting the focal length of the adaptive lens assembly, the plurality of lens units may be all activated or deactivated, and the activated lens units may be configured to have the same optical power.

For illustrative purposes, FIG. 3 shows each optical lens 305 may include four layers of lens units, and each layer has a lens unit. The total number of lens units or lens layers may be determined based on application requirements, such as desired lens resolution, response time, and/or optical power, etc. In another perspective, it may also be viewed that the adaptive lens assembly 300 may include a plurality of lens layers 310 (e.g., at least two lens layers) stacked together, and each lens layer 310 may include a plurality of lens units arranged in an array. That is, layers of array of the lens units may be stacked together to form an array of optical lenses 305, which forms the adaptive lens assembly 300. The total number of lens layers, the total number of lens units in each layer, and the length and width of the adaptive lens assembly 300 may be determined in advance based on various application scenarios.

Figure 4A:
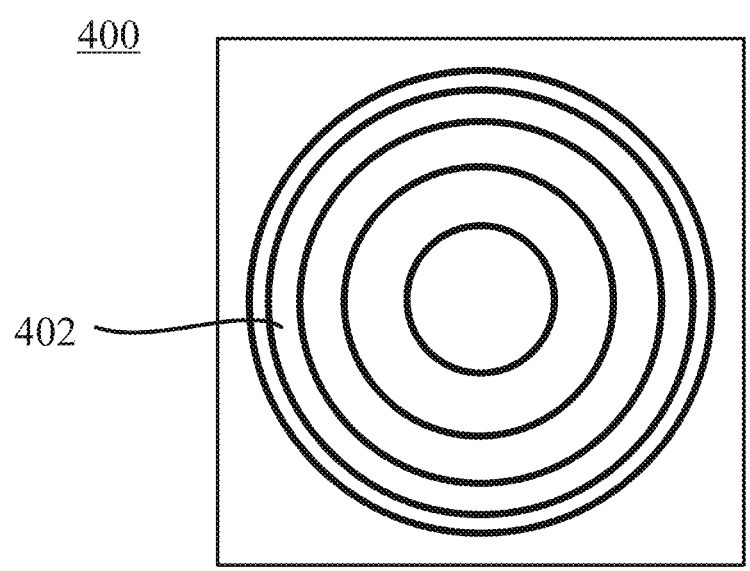
FIGS. 4A-4E illustrate an exemplary segmented phase profile (SPP) LC lens according to the present disclosure.

In some embodiments, the optical lens 305 may be an LC lens 305, and each lens unit in the optical lens 305 may be also an LC lens. A predetermined number of lens units (i.e., lens layers) may be stacked together to form the LC lens 305. FIG. 4A illustrates an exemplary lens unit 400 in the LC lens 305 consistent with the disclosed embodiments.

As shown in FIG. 4A, the lens unit 400 may include an LC lens with a Fresnel structure, i.e., a Fresnel LC lens. The Fresnel LC lens may include any appropriate type of Fresnel structure, such as a Fresnel zone plate lens including areas that have a phase difference of a half-wave to adjacent areas, a diffractive Fresnel lens having a segmented parabolic phase profile where the segments are small and can result in significant diffraction, or a refractive Fresnel lens having a segmented parabolic profile where the segments are large enough so that diffraction effects are minimized. Other structures may also be used.

In some embodiments, the lens unit 400 may include a refractive Fresnel LC lens having a segmented parabolic profile, where the segments are large enough such that the diffraction angle is smaller than the angular resolution of human eyes, i.e., diffraction effects are not observable by human eyes. Such a refractive Fresnel LC lens is referred as a segmented phase profile (SPP) LC lens 400. Referring to FIG. 4A, the Fresnel structure of the SPP LC lens 400 is represented by a plurality of concentric ring-shaped zones 402 of increasing radii, which are referred as Fresnel segments or Fresnel resets.

For a positive thin lens, optical path difference (OPD) is approximated with Maclaurin series to a parabolic profile as shown in Equation (1)

$$OPD(r) = \frac{r^2}{f}, \quad (1)$$

where r is the lens radius (i.e., half of the lens aperture) and f is the focal length. The OPD of an LC lens is proportional to the cell thickness d and the birefringence Δn of the LC material as shown in Equation (2)

$$OPD = d*\Delta n, \quad (2)$$

The response time τ of an Electrically Controlled Birefringence (ECB) LC cell, which is the time the material requires to recover to its original state, is quadratically dependent on cell thickness d ($\tau \propto d^2$) as shown in Equation (3)

$$\tau = \frac{\gamma \times d^2}{K_{11} \times \pi^2}, \quad (3)$$

where γ and $K_{11}$ are the rotational viscosity and the splay elastic constant of the LC material, respectively. Equations (1)-(3) show there is a tradeoff between the aperture size and response time, and thus designing an LC lens with large aperture and reasonable response time is an uphill task. In the disclosed embodiments, though introducing phase resets in the parabolic phase profile, i.e., using a SPP LC lens, a large aperture size of the LC lens may be allowed without compromising the response time.

Figure 4B:
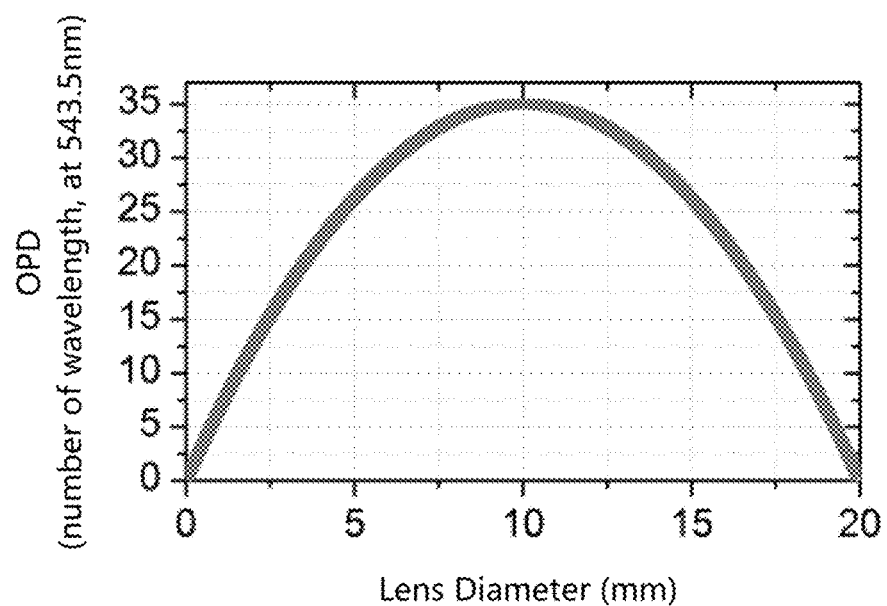
Figure 4C:
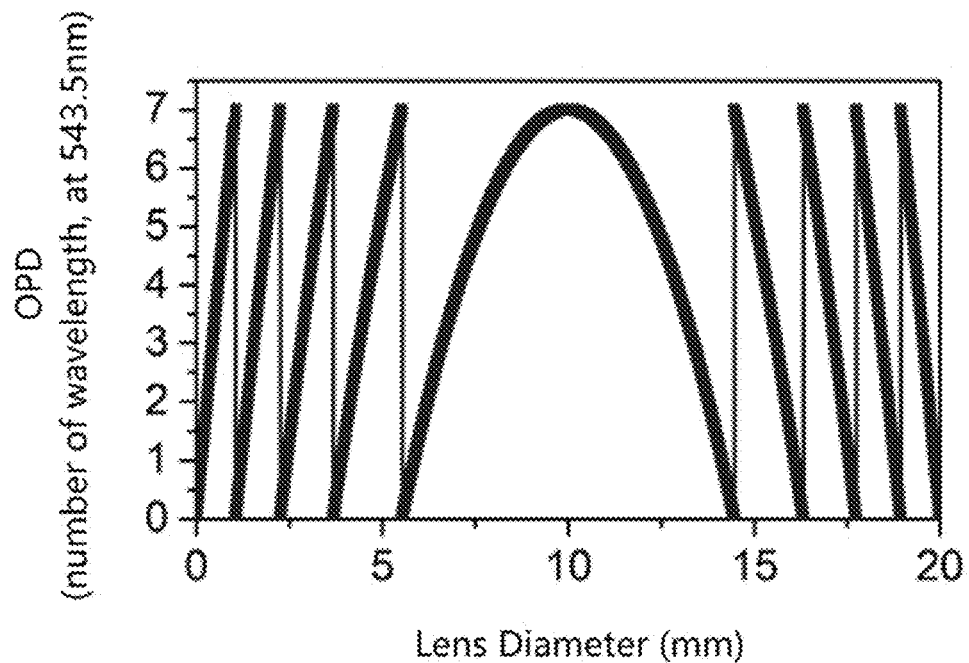

FIG. 4B illustrates a desired phase profile for ±0.375 Diopter (D) LC lens, where the OPD equals to 35λ. The thickness of the LC cell would be about 70 μm for LC materials with a birefringence value of 0.27. To decrease the effective thickness of the LC cell, resets or segments may be introduced into the lens phase profile. FIG. 4C illustrates 2D phase map of the SPP LC lens 400 with 5 resets, the thickness of the LC cell would be reduced up to 5 times and, accordingly, the response time would be improved by a factor of 25. That is, through introducing the segments in the lens phase profile, the optical power of the SPP LC lens 400 may be adjusted sufficiently fast to keep pace with eye accommodation (e.g., accommodation occurs in around 300 ms), such that the vergence-accommodation conflict would be resolved. The number of the resets may be determined based on specific configurations of the Fresnel structure and the SPP LC lens 400 requirements, such as the desired optical power, lens aperture, switching time, image quality of the LC lens. A large number of phase steps within one wavelength of OPD (i.e., per wavelength) may be desired for accurate representation of phase profile. Meanwhile, to configure the SPP LC lens with negligible diffraction angle for near eye applications, the minimum width of the Fresnel segments (i.e., the minimum Fresnel segment width) of the SPP LC lens 400, for green wavelength of 543.5 nm, is desired to be larger than 1.03 mm.

Figure 4D:
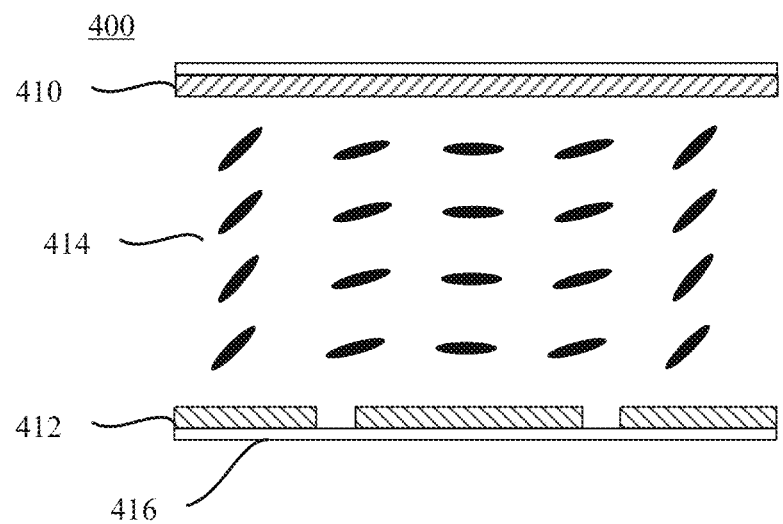

FIG. 4D illustrates a partial cross-sectional view of the SPP LC lens 400. As shown in FIG. 4D, the SPP LC lens 400 may include a plurality of first electrodes 412, one or more second electrode 410, a liquid crystal (LC) layer 414, and substrates 416. The substrates 416 may be substantially transparent in the visible band (~380 nm to 750 nm). In certain embodiments, the substrates 416 may also be transparent in some or all of the infrared (IR) band (~750 nm to 1 mm). The substrate layers may be composed of, e.g., $SiO_2$, plastic, sapphire, etc. The first electrodes 412 and second electrodes 410 may be transparent electrodes (e.g., indium tin oxide electrodes) disposed on the substrates 416 to generate electric fields, which reorients the LC molecules in the LC layer 414 to form a lens having a desired phase profile.

In some embodiments, the first electrodes 412 may include discrete ring-shaped electrodes corresponding to the Fresnel structures in the SPP LC lens 400, and the ring-shaped electrodes may be concentric with identical area. With this electrode geometry, when the phase difference between adjacent first electrodes 412 is the same, a parabolic phase profile may be obtained. If the phase is proportional to the applied voltage, a linear change in the voltage across the first electrodes 412 (same difference in voltage between any two first electrodes 412) may yield a desired parabolic phase profile.

Figure 4E:
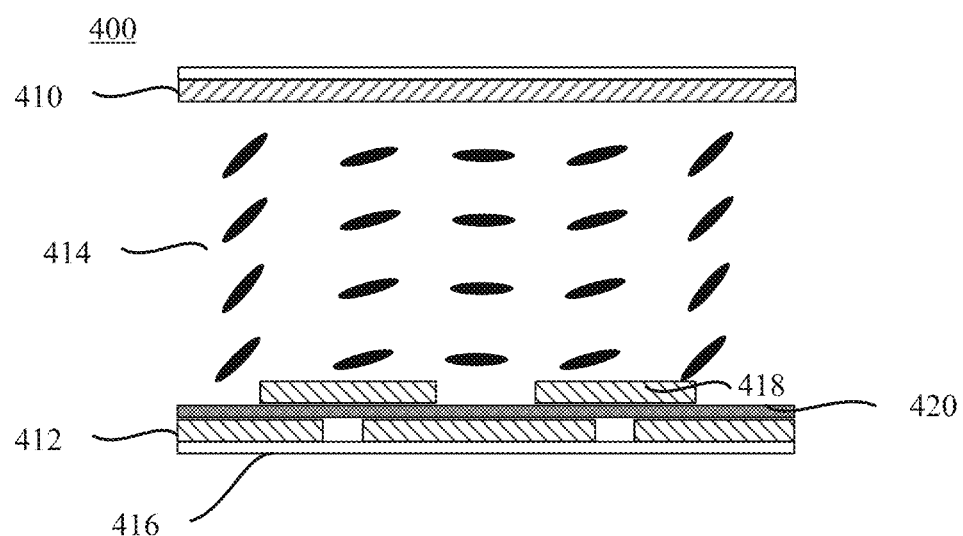

Further, the gaps between the first electrodes 412 can cause scattering and thus image degradation. To address that image degradation, as shown in FIG. 4E, a plurality of floating electrodes 418 may be disposed on the substrate 416 provided with the first electrodes 512. The floating electrodes 418 may include discrete and concentric ring electrodes which are not driven by ohmic connection but are capacitively coupled to the first electrodes 412. The floating electrodes 418 may be configured to cover half of the area of each of neighboring first electrodes 412. An insulating layer 420 may be disposed between the floating electrodes 418 and the first electrodes 412.

Figure 5:
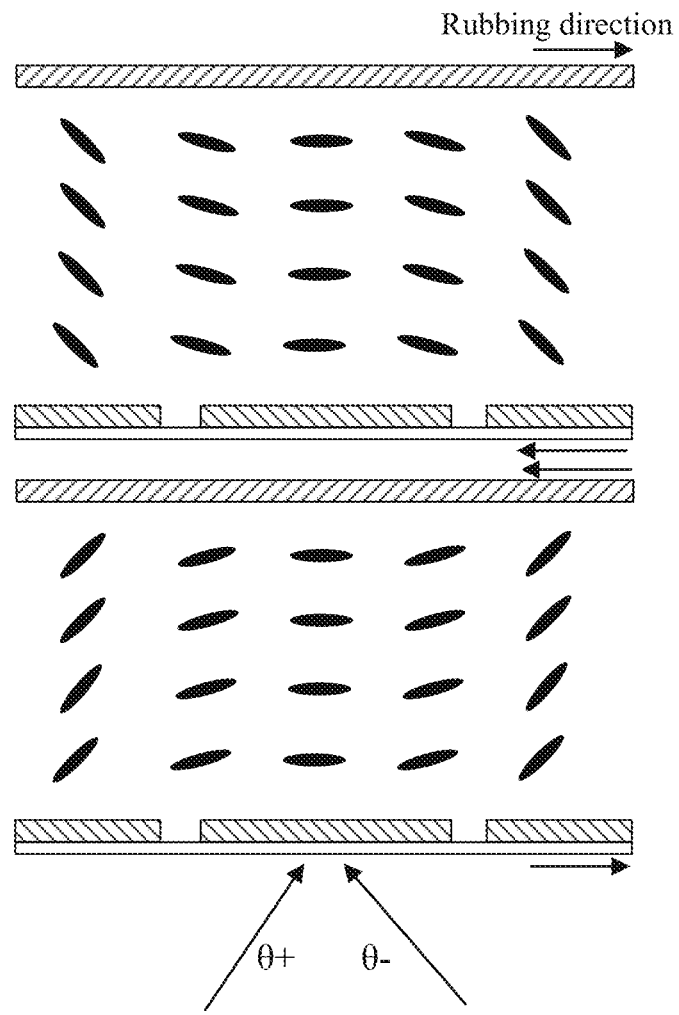
FIG. 5 illustrates an exemplary configuration of two stacked SPP LC lenses according to the present disclosure.

To further improve the response time of the SPP LC lens, multiple SPP LC lens (i.e., multiple lens layers) may be optically coupled to form a stack of SPP LC lens, i.e., an SPP LC lens stack, such that given a same tunable optical power range, the thickness of each SPP LC lens may be reduced and, accordingly, the response of each SPP LC lens may be reduced. For illustrative purposes, FIG. 5 shows a pair of SPP LC lenses may be optically coupled to form an SPP LC lens stack. Provided that each SPP LC lens has 5 resets in the phase profile, considering the effect of the pair of lenses and the Fresnel resets, the thickness of the LC cell may be reduced up to 10 times (5 resets×2) and, accordingly, the response speed may be improved by a factor of 100.

Further, the two SPP LC lenses may have opposite rubbing directions or alignment directions on the corresponding LC surfaces of the two SPP LC lens, so as to improve the viewing angle. That is, for viewing angle improvement, two of SPP LC lenses with the same configuration but opposite rubbing directions may be optically coupled. The polarization insensitivity is very important for AR configuration. Most LC materials are birefringent and, thus, are polarization sensitive. When the light propagating in a direction parallel to the LC director is incident onto the LC cell, the light will experience ordinary refractive index $n_o$ of the LC material for any polarization states. However, when the light propagating in a direction perpendicular to the LC director is incident onto the LC cell, the light will experience refractive index between the ordinary refractive index $n_o$ and extraordinary refractive index $n_e$ of the LC material, depending on the polarization state of light. Cholesteric LC materials can be made polarization insensitive as discussed by Clarke et al. in Electro-active lens U.S. Pat. No. 7,728,949B2. In this case the pitch of cholesteric LCs can be made in the range of the wavelength of incident light and, therefore, when no voltage is applied to the LC cell, the light will experience an average refractive index $$\left(\frac{n_o + n_e}{2}\right)$$

for any polarization states of light. For nematic LCs, the SPP LC lenses may be configured to be polarization insensitive by optically coupling cells of orthogonal polarization, in which each cell may focus one polarization state of light, for example, one cell focuses s polarization and the other focuses p polarization.

Returning to FIG. 3, to enable the LC lens 305 to adjust the optical power sufficiently fast to keep pace with eye accommodation (e.g., accommodation occurs in around 300 ms), each LC lens 305 may be formed by lens layers of SPP LC lenses, and each SPP LC lens may be configured to have a reduced aperture size. That is, in addition to use more lens layers of the SPP LC lenses, each layer may include an array of SPP LC lenses with a reduced aperture size, and the array of SPP LC lenses may be fabricated together at the same time as a single lens layer, e.g., on a single wafer.

Figure 6A:
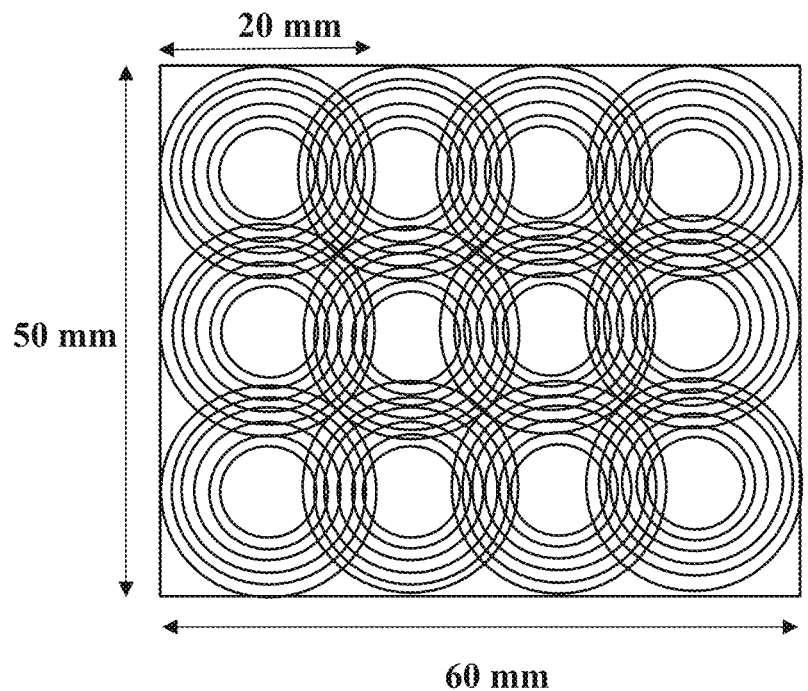
FIGS. 6A-6C illustrate exemplary configurations of an SPP LC lens array in a single lens layer according to the present disclosure.
Figure 6B:
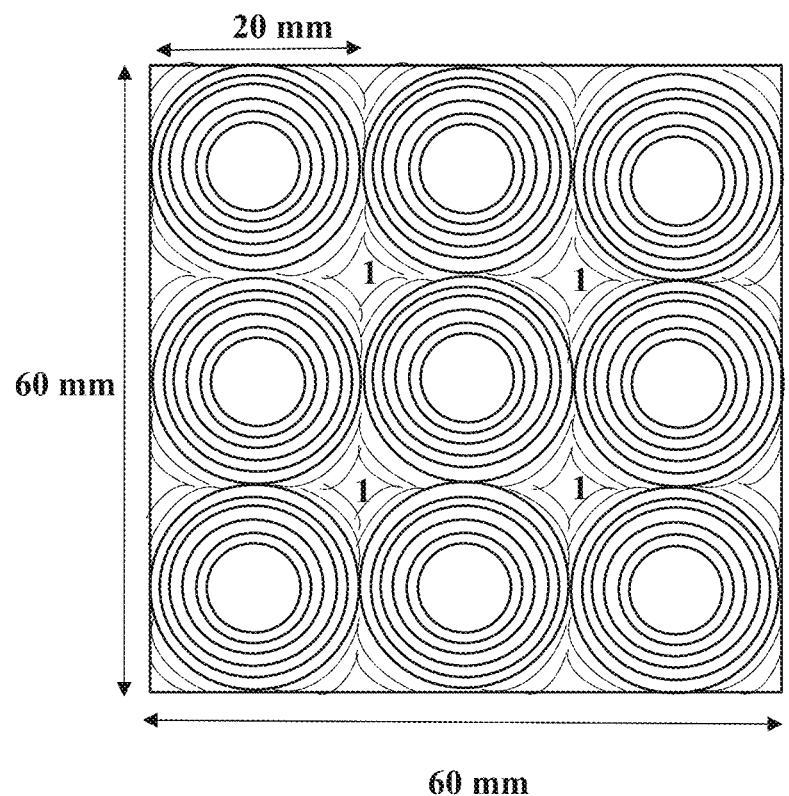
Figure 6C:
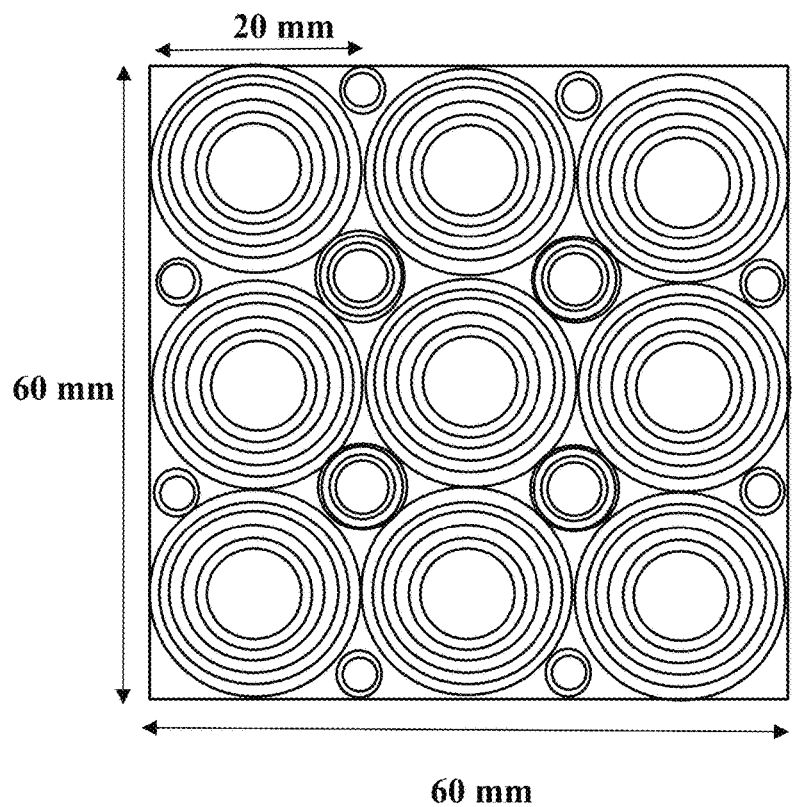

Below various designs of varifocal structures are discussed. FIGS. 6A-6C illustrate exemplary configurations of the SPP LC lens array in a single lens layer. As shown in FIG. 6A, the array of SPP LC lenses may include identical individual SPP LC lenses configured in an overlapped format. In this configuration, the individual SPP LC lenses may be overlapped in both the horizontal direction and the vertical direction. That is, the electrode patterns of the neighboring SPP LC lenses may have overlap. In one embodiment, the array of SPP LC lenses may have a length of 60 mm and a width of 50 mm, and the aperture size of a single SPP LC lens may be 20 mm. In this configuration, four SPP LC lenses may be arranged in the horizontal direction and three SPP LC lenses may be arranged in the vertical direction.

As shown in FIG. 6B, the array of SPP LC lenses may include identical individual SPP LC lenses configured in a non-overlapped format. In this configuration, the individual SPP LC lenses 305 may be arranged in both the horizontal direction and the vertical direction. That is, the electrode patterns of the neighboring SPP LC lenses 305 may have no overlap. However, in areas between neighboring SPP LC lenses 305, e.g., area 1 in FIG. 6B, the electric field of each area may be adjusted such that the phase profile of individual SPP LC lens 305 may be preserved. In one embodiment, the array of SPP LC lenses may have a length of 60 mm and a width of 60 mm, and the size of a single SPP LC lens may be 20 mm. In this configuration, three SPP LC lenses may be arranged in the horizontal direction and three SPP LC lenses may be arranged in the vertical direction.

As shown in FIG. 6C, the array of SPP LC lenses may include different levels of SPP LC lenses, and each level may include identical individual SPP LC lenses configured in a non-overlapped format. In this configuration, the individual SPP LC lenses may be arranged in both the horizontal direction and the vertical direction without overlap, but a lower level of SPP LC lenses may be arranged in areas between a current level of SPP LC lenses until the SPP LC lenses have a diameter smaller than the eye resolution (about 1 arcmin). That is, the electrode patterns of the SPP LC lenses may have no overlap. However, the different levels of SPP LC lenses may be configured to preserve a more uniform parabolic phase profile of individual SPP LC lens. For example, a second-level of SPP LC lenses may be disposed in areas between neighboring SPP LC lenses, and a third-level of SPP LC lenses may be disposed in areas between neighboring second-level SPP LC lenses. In one embodiment, the array of SPP LC lenses may have a length of 60 mm and a width of 60 mm, and the size of a single top level SPP LC lens may be 20 mm, three levels of SPP LC lenses may be included.

For illustrative purposes, FIGS. 6A-6C merely illustrate exemplary configurations of the SPP LC lens array in a single lens layer. Referring to FIG. 3, the adaptive lens assembly 300 may include a plurality of lens layers 310 (e.g., at least two lens layers) stacked together, and each lens layer 310 may include a plurality of lens units arranged in an array, in which each lens layer may be any one of the single lens layers shown in FIGS. 6A-6C. The formed adaptive lens assembly 300 may replace a 50-mm-aperture SPP LC lens, for example, the formed adaptive lens assembly 300 in which each lens layer includes 4×3 20-mm-aperture SPP LC lens array may replace a 50-mm-aperture SPP LC lens, such that the tunable optical power range, response time, and/or resolution of the lens of the individual SPP LC lenses may be configured in desired ranges and the overall lens properties of the adaptive lens assembly 300 may also be in a desired range for VR, AR, MR applications, or some combination thereof.

Referring to FIG. 2B, FIG. 3 and FIGS. 6A-6C, in an operation of the HMD, the eye tracking system 270 may detect an eye position for each eye of the user. For example, the eye tracking system 270 may determine a location or an object in the displayed virtual scene/image at which the user's eye 265 is currently looking. Then the SPP LC lens(es) 305 corresponding to the location or the object in the virtual scene at which the user's eye 265 is currently looking may be activated, and the optical power of the activated SPP LC lens(es) may be adjusted to address the vergence-accommodation conflict. However, because only one or a few SPP LC lenses in the lens array may be activated at one time, the center of the activated SPP LC lens(es) 305, which is referred as a local lens center, may be different from the center of the adaptive lens assembly 300. That is, a shift may exist between the local lens center and the center of the adaptive lens assembly 300, i.e., a lens center shift. As a result, the user's eye 265 may observe an angular shift of the displayed image caused by the lens center shift. To compensate for the angular shift caused by the lens center shift, the electronic display 255 may shift the displayed image along with the lens center shift, such that the user's eye 265 does not feel any shift on the displayed image. That is, an image shift may be introduced to compensate for the angular shift caused by the lens center shift, where the image shift is a shift between the same point in the displayed image before shift and after shift. For example, the image shift is a shift between the center of the displayed image before shift and after shift.

Figure 6D:
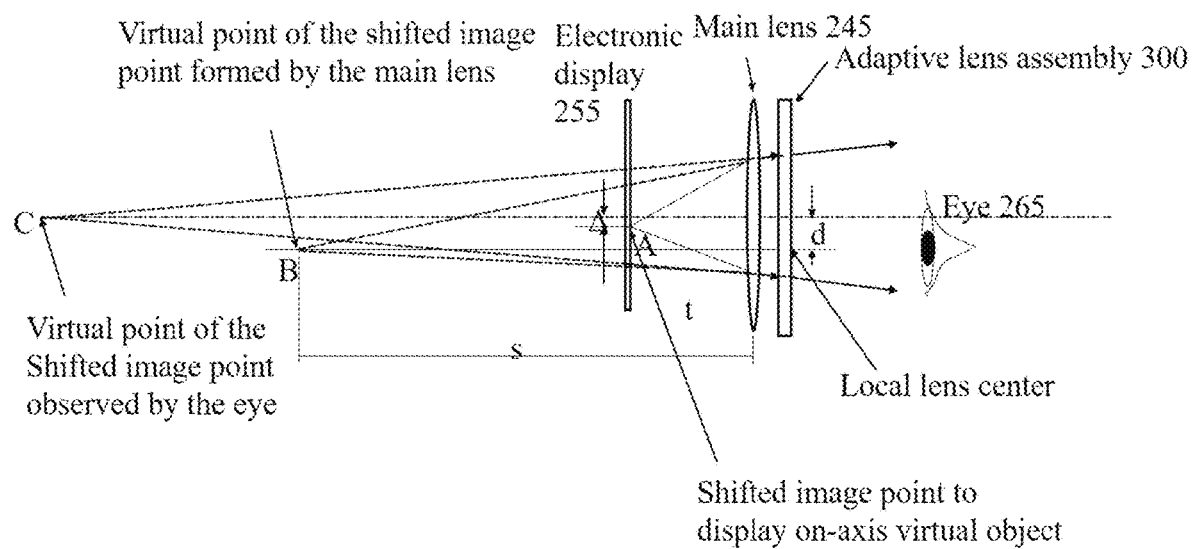
FIG. 6D illustrates exemplary lens center shift and image shift according to the present disclosure.

FIG. 6D illustrates exemplary lens center shift and image shift according to the present disclosure. As shown in FIG. 6D, the varifocal block may include a main lens 245 in addition to the adaptive lens assembly 300. After the SPP LC lens(es) corresponding to the location or the object in the displayed image at which the user's eye 265 is currently looking is activated, the lens center shift is d. To display an on-axis image point C to be observed by the eye 265, the corresponding image point A (shifted image point A) displayed on the electronic display 255 is shifted by $\Delta$, i.e., the image shift is $\Delta$. The image point B is a virtual point of the shifted image point A formed by the main lens 245, and the image point C is a virtual point of the shifted image point A to be observed by the eye 265. t is a distance between the main lens 245 and the electronic display 255, and the value of t may depend on design requirements of the size and field of view (FOV) of the electronic display 255. The main lens 245 may be configured to have a focal length F greater than t (i.e., F>t), such that the virtual image formed by the main lens is at some finite distance. In this way, the adaptive lens assembly 300 may be configured to provide negative or positive optical power depending on the displayed virtual image distance. For the shifted image point A, t and s are an object distance and an image distance of the image point A with respect to the main lens 245. The image shift on the electronic display 255 is calculated as $\Delta=d*t/s$. For example, when a displayed image is desired to be observed at 0.5 m to infinity (i.e., 2D), given s=1 m, then the optical power range of the adaptive lens assembly 300 would be −1D to +1D. When t~30 mm, the image shift $\Delta=~0.03d$. That is, when the lens center shift is 20 mm, the image shift may be 0.6 mm.

Thus, based on the above approaches, the response time, the resolution, the tunable optical power range, and/or the image quality of the adaptive lens assembly 300 may be in a desired range for VR, AR, and MR applications, or some combination thereof. For AR or MR applications, another adaptive lens assembly may be introduced to compensate the distortion of the real-world images caused by the adaptive lens assembly 300. The another adaptive lens assembly may provide optical power, which is opposite to but having a same absolute value as the optical power provided by the adaptive lens assembly 300, such that the real-world objects viewed through the HMD may stay unaltered.

Figure 7:
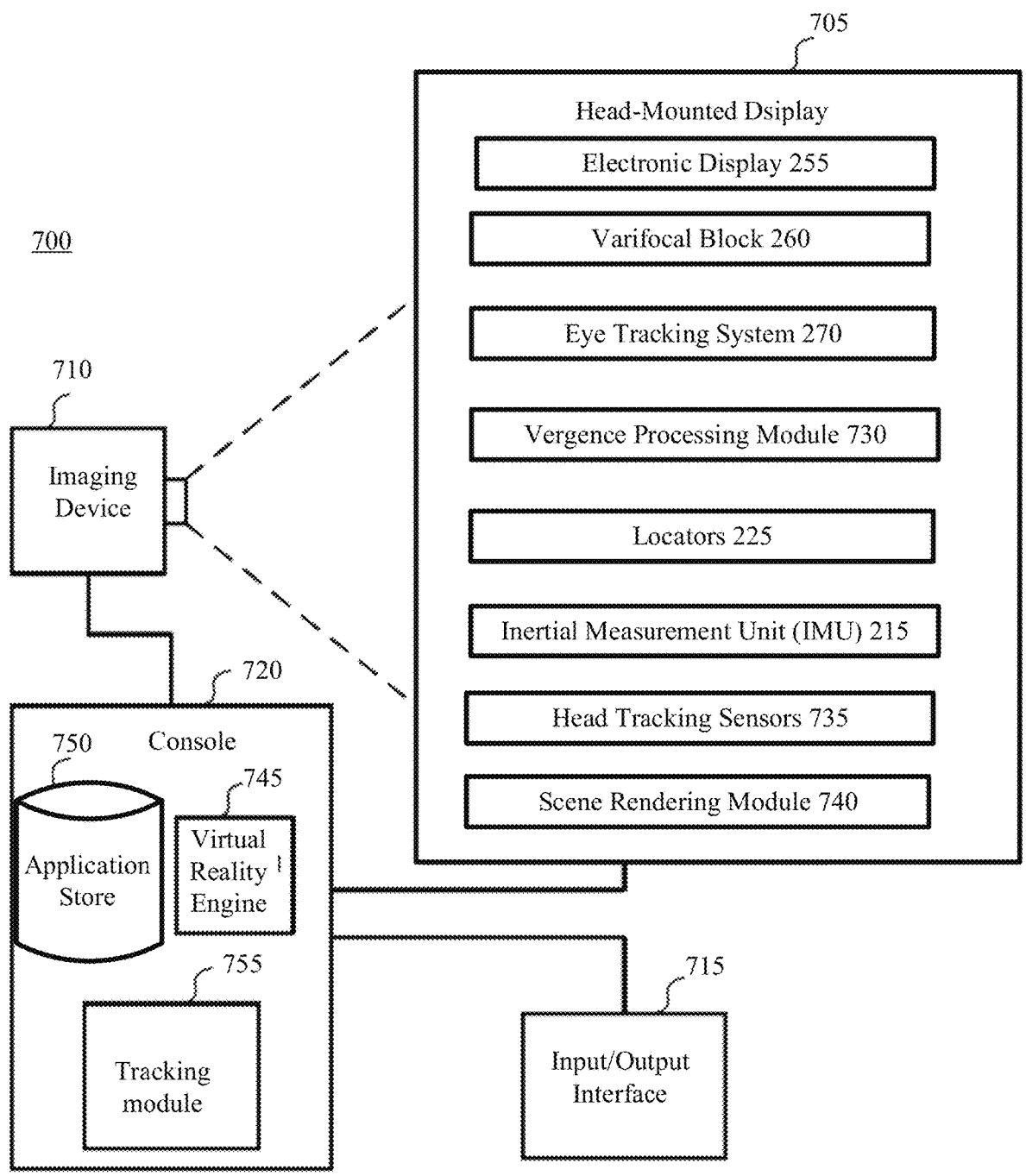
FIG. 7 illustrates an exemplary varifocal system in which an HMD operates according to the present disclosure.

FIG. 7 illustrates an exemplary varifocal system 700 including certain aspects of disclosed embodiments. The varifocal system 700 may be used for a VR system, an AR system, a MR system, or some combination thereof. As shown in FIG. 7, the varifocal system 700 may include an imaging device 710, a console 720, an input/output interface 715, and a head-mounted display (HMD) 200. Certain device(s) may be omitted, and other devices or components may also be included. Although FIG. 7 shows a single HMD 705, a single imaging device 710, and a single input/output interface 715, any number of these components may be included in the varifocal system 700. The HMD 705 may act as a VR, AR, and/or a MR HMD.

The HMD 705 may present content to a user. In some embodiments, the HMD 705 may be an embodiment of the HMD 200 described above with reference to FIGS. 2A and 2B. Example content includes images, video, audio, or some combination thereof. Audio content may be presented via a separate device (e.g., speakers and/or headphones) external to the HMD 705 that receives audio information from the HMD 705, the console 820, or both. The HMD 705 may include an electronic display 255 (described above with reference to FIG. 2B), a varifocal block 260 (described above with reference to FIG. 2B), an eye tracking system 270, a vergence processing module 730, one or more locators 225, an internal measurement unit (IMU) 215, head tracking sensors 735, and a scene rendering module 740.

The eye tracking system 270 may track an eye position and eye movement of a user of the HMD 705. A camera or other optical sensor (that is part the eye tracking system 270) inside the HMD 705 may capture image information of a user's eyes, and the eye tracking system 270 may use the captured information to determine interpupillary distance, interocular distance, a three dimensional (3D) position of each eye relative to the HMD 705 (e.g., for distortion adjustment purposes), including a magnitude of torsion and rotation (i.e., roll, pitch, and yaw) and gaze directions for each eye.

In some embodiments, infrared light may be emitted within the HMD 705 and reflected from each eye. The reflected light may be received or detected by the camera and analyzed to extract eye rotation from changes in the infrared light reflected by each eye. Many methods for tracking the eyes of a user may be used by eye tracking system 270. Accordingly, the eye tracking system 270 may track up to six degrees of freedom of each eye (i.e., 3D position, roll, pitch, and yaw), and at least a subset of the tracked quantities may be combined from two eyes of a user to estimate a gaze point (i.e., a 3D location or position in the virtual scene where the user is looking). For example, the eye tracking system 270 may integrate information from past measurements, measurements identifying a position of a user's head, and 3D information describing a scene presented by the electronic display 255. Thus, information for the position and orientation of the user's eyes is used to determine the gaze point in a virtual scene presented by the HMD 705 where the user is currently looking.

The varifocal block 260 may adjust its focal length (i.e., optical power) by adjusting a focal length of one or more varifocal structures. As noted above with reference to FIGS. 6A-6C, based on the eye tracking information, the varifocal block 260 may activate one or more LC lenses corresponding to the eye position for each eye of the user, and adjust its focal length by adjusting the voltages applied to the electrodes of the one or more activated LC lenses. The varifocal block 260 may adjust its focal length responsive to instructions from the console 720. Note that a varifocal tuning speed of a varifocal structure is limited by a tuning speed of the LC lenses. The varifocal block 260 may deactivate other LC lenses which are not corresponding to the eye position for each eye of the user, thereby reducing the power consumption of the varifocal block 260. In addition, the varifocal block 260 may determine a shift between the center of the activated LC lens(es) and the center of the adaptive lens assembly, i.e., a lens center shift.

The vergence processing module 730 may determine a vergence distance of a user's gaze based on the gaze point or an estimated intersection of the gaze lines determined by the eye tracking system 270. Vergence is the simultaneous movement or rotation of both eyes in opposite directions to maintain single binocular vision, which is naturally and automatically performed by the human eye. Thus, a location where a user's eyes are verged is where the user is currently looking and is also typically the location where the user's eyes are currently focused. For example, the vergence processing module 730 may triangulate the gaze lines to estimate a distance or depth from the user associated with intersection of the gaze lines. Then the depth associated with intersection of the gaze lines may be used as an approximation for the accommodation distance, which identifies a distance from the user where the user's eyes are directed. Thus, the vergence distance may allow the determination of a location where the user's eyes should be focused.

The locators 225 may be objects located in specific positions on the HMD 705 relative to one another and relative to a specific reference point on the HMD 705. A locator 225 may be a light emitting diode (LED), a corner cube reflector, a reflective marker, a type of light source that contrasts with an environment in which the HMD 705 operates, or some combination thereof.

The IMU 215 may be an electronic device that generates fast calibration data based on measurement signals received from one or more of the head tracking sensors 735, which generate one or more measurement signals in response to motion of HMD 705. Examples of the head tracking sensors 735 include accelerometers, gyroscopes, magnetometers, other sensors suitable for detecting motion, correcting error associated with the IMU 215, or some combination thereof.

Based on the measurement signals from the head tracking sensors 735, the IMU 215 may generate fast calibration data indicating an estimated position of the HMD 705 relative to an initial position of the HMD 705. For example, the head tracking sensors 735 may include multiple accelerometers to measure translational motion (forward/back, up/down, left/right) and multiple gyroscopes to measure rotational motion (e.g., pitch, yaw, and roll). The IMU 215 may, for example, rapidly sample the measurement signals and calculate the estimated position of the HMD 705 from the sampled data. Alternatively, the IMU 215 may provide the sampled measurement signals to the console 720, which determines the fast calibration data.

The IMU 215 may additionally receive one or more calibration parameters from the console 720. As further discussed below, the one or more calibration parameters may be used to maintain tracking of the HMD 705. Based on a received calibration parameter, the IMU 215 may adjust one or more of the IMU parameters (e.g., sample rate). In some embodiments, certain calibration parameters may cause the IMU 215 to update an initial position of the reference point to correspond to a next calibrated position of the reference point. Updating the initial position of the reference point as the next calibrated position of the reference point may help to reduce accumulated error associated with determining the estimated position. The accumulated error, also referred to as drift error, may cause the estimated position of the reference point to "drift" away from the actual position of the reference point over time.

The scene rendering module 740 may receive contents for the virtual scene from a VR engine 745, and provide display content for display on the electronic display 255. The scene rendering module 740 may include a hardware central processing unit (CPU), graphic processing unit (GPU), and/or a microcontroller. Additionally, the scene rendering module 740 may adjust the content based on information from the eye tracking system 270, the vergence processing module 730, the IMU 215, and the head tracking sensors 735. The scene rendering module 740 may determine a portion of the content to be displayed on the electronic display 255, based on one or more of the eye tracking system 270, the tracking module 755, the head tracking sensors 735, or the IMU 215. For example, the scene rendering module 740 may determine a virtual scene to be displayed to the viewer's eyes, or any part of the virtual scene. The scene rendering module 740 may also dynamically adjust the displayed content based on the real-time configuration of the varifocal block 260. In addition, based on the information of the determined lens center shift provided by the varifocal block 260, the scene rendering module 740 may determine a shift of the virtual scene to be displayed on the electronic display 255.

The imaging device 710 may provide a monitoring function for the HMD 705 and may generate slow calibration data in accordance with calibration parameters received from the console 720. Slow calibration data may include one or more images showing observed positions of the locators 225 that are detectable by imaging device 710. The imaging device 710 may include one or more cameras, one or more video cameras, other devices capable of capturing images including one or more locators 225, or some combination thereof. Slow calibration data may be communicated from the imaging device 710 to the console 720, and the imaging device 710 may receive one or more calibration parameters from the console 720 to adjust one or more imaging parameters (e.g., focal length, focus, frame rate, ISO, sensor temperature, shutter speed, aperture, etc.).

The input/output interface 715 may be a device that allows a user to send action requests to the console 720. An action request may be a request to perform a particular action. For example, an action request may be to start or end an application or to perform a particular action within the application. The input/output interface 715 may include one or more input devices such as a keyboard, a mouse, a game controller, or any other suitable device. An action request received by the input/output interface 715 may be communicated to the console 720, which performs an action corresponding to the action request. In some embodiments, the input/output interface 715 may provide haptic feedback to the user in accordance with instructions received from the console 720. For example, haptic feedback may be provided by the input/output interface 715 when an action request is received, or the console 720 may communicate instructions to the input/output interface 715 causing the input/output interface 715 to generate haptic feedback when the console 720 performs an action.

The console 720 may provide content to the HMD 705 for presentation to the user in accordance with information received from the imaging device 710, the HMD 705, or the input/output interface 715. In one embodiment, as shown in FIG. 7, the console 720 may include an application store 750, a tracking module 755, and the VR engine 745, etc.

The application store 750 may store one or more applications for execution by the console 720. An application may be a group of instructions, that when executed by a processor, generates content for presentation to the user. Content generated by an application may be in response to inputs received from the user via movement of the HMD 705 or the input/output interface 715. Examples of applications include gaming applications, conferencing applications, video playback application, or other suitable applications.

The tracking module 755 may calibrate the varifocal system 700 using one or more calibration parameters and may adjust one or more calibration parameters to reduce error in determining position of the HMD 705. For example, the tracking module 755 may adjust the focus of the imaging device 710 to obtain a more accurate position for observed locators 225 on the HMD 705. Moreover, calibration performed by the tracking module 755 may also account for information received from the IMU 215. Additionally, when tracking of the HMD 705 is lost (e.g., imaging device 710 loses line of sight of at least a threshold number of locators 225), the tracking module 755 may re-calibrate some or all of the varifocal system 700 components.

Additionally, the tracking module 755 may track the movement of the HMD 705 using slow calibration information from the imaging device 710, and determine positions of a reference point on the HMD 705 using observed locators from the slow calibration information and a model of the HMD 705. The tracking module 755 may also determine positions of the reference point on the HMD 705 using position information from the fast calibration information from the IMU 215 on the HMD 705. Additionally, the tracking module 755 may use portions of the fast calibration information, the slow calibration information, or some combination thereof, to predict a future location of the HMD 705, which is provided to the VR engine 745.

The VR engine 745 may execute applications within the varifocal system 700 and receive position information, acceleration information, velocity information, predicted future positions, or some combination thereof for the HMD 705 from the tracking module 755. Based on the received information, the VR engine 745 may determine content to provide to the HMD 705 for presentation to the user, such as a virtual scene, one or more virtual objects to overlay onto a real-world scene, etc. In some embodiments, the VR engine 845 may maintain focal capability information of the varifocal block 260. Focal capability information is information that describes what focal distances are available to the varifocal block 260. Focal capability information may include, e.g., a range of focus that the varifocal block 260 is able to accommodate (e.g., 0 to 4 diopters), combinations of settings for each activated LC lens that map to particular focal planes; or some combination thereof.

The VR engine 745 may provide information to the varifocal block 260, such as the accommodation and/or convergence parameters including what focal distances are available to the varifocal block 260. The VR engine 745 may generate instructions for the varifocal block 260, the instructions causing the varifocal block 260 to adjust its focal distance to a particular location. The VR engine 745 may generate the instructions based on focal capability information and, e.g., information from the vergence processing module 730, the IMU 215, and the head tracking sensors 735, and provide the instructions to the varifocal block 260 to configure and/or adjust the adaptive assembly 260. The VR engine 745 may use the information from the vergence processing module 730, the IMU 215, and the head tracking sensors 735, or some combination thereof, to select a focal plane to present content to the user. Additionally, the VR engine 745 may perform an action within an application executing on the console 720 in response to an action request received from the input/output interface 715, and provide feedback to the user that the action was performed. The provided feedback may be visual or audible feedback via the HMD 705 or haptic feedback via the input/output interface 715.

FIG. 8 is a process 800 for mitigating vergence-accommodation conflict by adjusting the focal length of the HMD 705 according to the present disclosure. The process 900 may be performed by the varifocal system 700 in some embodiments. Alternatively, other components may perform some or all of the steps of the process 800. For example, in some embodiments, an HMD 705 and/or a console (e.g., console 720) may perform some of the steps of the process 800. Additionally, the process 800 may include different or additional steps than those described in conjunction with FIG. 8 in some embodiments or perform steps in different orders than the order described in conjunction with FIG. 8.

Additionally, the process 800 may include different or additional steps than those described in conjunction with FIG. 8 in some embodiments or perform steps in different orders than the order described in conjunction with FIG. 8.

Referring to FIG. 7 and FIG. 8, the varifocal system 700 may determine a position, an orientation, and/or a movement of HMD 705 (Step 810). The position may be determined by a combination of the locators 225, the IMU 215, the head tracking sensors 735, the imagining device 710, and the tracking module 755, etc., as described above in conjunction with FIG. 7.

The varifocal system 700 may determine a portion of a virtual scene based on the determined position and orientation of the HMD 705 (Step 820). The varifocal system 700 may map a virtual scene presented by the HMD 705 to various positions and orientations of the HMD 705. Thus, a portion of the virtual scene currently viewed by the user may be determined based on the position, orientation, and movement of the HMD 705.

The varifocal system 700 may display the determined portion of the virtual scene being on an electronic display (e.g., the electronic display 255) of the HMD 705 (Step 830). In some embodiments, the portion may be displayed with a distortion correction to correct for optical error that may be caused by the image light passing through the varifocal block 260.

The varifocal system 700 may determine an eye position for each eye of the user using an eye tracking system (Step 840). The varifocal system 700 may determine a location or an object within the determined portion at which the user is looking to adjust focus for that location or object accordingly. To determine the location or object within the determined portion of the virtual scene at which the user is looking, the HMD 705 may track the position and location of the user's eyes using image information from (e.g., the eye tracking system 270) of the HMD 705. For example, the HMD 705 may track at least a subset of a 3D position, roll, pitch, and yaw of each eye, and use these quantities to estimate a 3D gaze point of each eye.

Further, based on the eye tracking information, the varifocal system 700 may determine a desired optical power of the HMD 705 based on a vergence distance (Step 850). In some embodiment, the varifocal system 700 may determine the vergence distance based on an estimated intersection of gaze lines. In some embodiments, information from past eye positions, information describing a position of the user's head, and information describing a scene presented to the user may be used to estimate the 3D gaze point of an eye. The optical power required may then be calculated based on the vergence distance of the virtual scene and other information.

Based on the determined optical power of the HMD 705 and the eye tracking information, the varifocal system 700 may determine configuration parameters for the LC lenses in the varifocal block 260 (Step 860). In particular, based on the eye tracking information, the varifocal system 700 may activate one or more LC lenses corresponding to the eye position for each eye of the user and, meanwhile, based on the determined optical power, the varifocal system 700 may determine desired voltages to be applied to the electrodes of the one or more activated LC lens.

For example, as the varifocal block 260 includes an array of LC lenses each having a predetermined number of layers of SPP LC lens units, the varifocal system 700 may determine which LC lens or lenses in the array should be used. In one embodiment, based on the 3D gaze point of the eye, the varifocal system 700 may determine an LC lens that intersects with the gaze line of the eye, and may select that LC lens to be activated. In some embodiments, when the gaze line of the eye falls in an area between neighboring LC lenses, the varifocal system 700 may also select one or more neighboring LC lenses to be activated or may select an SPP LC lens closest to the gaze line to be activated.

The varifocal system 700 may also determine an overall desired optical power value for the selected LC lens or lenses. As the selected LC lens has a plurality of layers of SPP LC lenses, and each SPP LC lens may have a specific optical power range, certain or all layers of SPP LC lenses may be selected based on the specific optical power range and the overall desired optical power. The varifocal system 700 may select the lens layers arranged in sequence to satisfy the overall optical power, or may randomly select the lens layers to satisfy the overall optical power. In one embodiment, the varifocal system 700 may select the layers of SPP LC lenses in pairs as shown in FIG. 7 to improve the viewing angle. In addition, the varifocal system 700 may also select the layers of SPP LC lenses so as to satisfy the polarization insensitive state of the selected layers of SPP LC lenses. Other selecting criteria may also be used.

After the configurations of the SPP LC lenses of the varifocal block 260 are determined, the varifocal system 700 may adjust the SPP LC lenses based on the configurations (Step 870). For example, for each selected SPP LC lens to be activated in each selected layer of SPP LC lenses to be activated, the varifocal system 700 may apply the determined voltages on the electrodes of the selected SPP LC lens(es) in each selected layer to activate the selected SPP LC lenses. The varifocal system 700 may keep other unselected SPP LC lenses inactivated. Thus, accommodation may be provided for the determined vergence distance corresponding to where or what in the displayed portion of the virtual scene the user is currently looking.

Further, based on the position of the activated LC lens(es), the varifocal system 700 may adjust the displayed virtual scene to correct the lens center shift (S880). In particular, because only one or a few LC lenses in the lens array in the adaptive lens assembly may be activated at one time, the center of the activated LC lens or the lenses may be different from the center of the entire adaptive assembly. When it is determined that the center of the activated SPP LC lens or lenses is different from the center of the adaptive lens assembly, a shift between the two centers, i.e., a lens center shift, may be calculated. Based on the calculated lens center shift, the image displayed on the electronic display may be shifted accordingly to compensate for the lens center shift, such that the viewer does not feel any shift on the displayed image.

The foregoing description of the embodiments of the disclosure have been presented for the purpose of illustration. It is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A system, comprising:
   an electronic display configured to display a virtual image;
   an eye tracking device including a sensor configured to obtain eye tracking information for determining a vergence of a user;
   an adaptive lens assembly optically coupled to the electronic display, the adaptive lens assembly comprising a plurality of adjustable liquid crystal (LC) lenses arranged in an array; and
   a controller configured to:
      selectively activate one or more of the plurality of adjustable LC lenses to adjust a focal length of the adaptive lens assembly to reduce a determined discrepancy between the vergence and an accommodation associated with the vergence;
      determine a lens center shift between a center of the selectively activated one or more of the plurality of adjustable LC lenses and a center of the adaptive lens assembly; and
      determine an image shift based on the lens center shift, wherein the electronic display is configured to shift the virtual image by the image shift.

2. The system according to claim 1, wherein at least one of the adjustable LC lenses includes a plurality of segmented phase profile (SPP) LC lenses stacked together, and the adaptive lens assembly includes layers of array of SPP LC lenses.

3. The system according to claim 2, wherein at least one of the SPP LC lenses is a refractive Fresnel LC lens including a plurality of concentric ring-shaped Fresnel segments of increasing radii.

4. The system according to claim 2, wherein:
at least one of the SPP LC lenses includes a plurality of ring-shaped electrodes corresponding to the concentric ring-shaped Fresnel segments,
the ring-shaped electrodes are concentric with an identical area,
a phase difference between adjacent electrodes is the same, and
a phase profile of the at least one of the SPP LC lenses is a parabolic phase profile.

5. The system according to claim 4, wherein:
the at least one of the plurality of SPP LC lenses further includes a plurality of floating electrodes which are discrete and concentric ring-shaped electrodes; and
the floating electrodes are capacitively coupled to the ring-shaped electrodes by an insulating layer, and at least one of the floating electrodes covers a portion of each of the neighboring ring-shaped electrodes.

6. The system according to claim 4, wherein:
within a same layer of array of SPP LC lenses, the plurality of SPP LC lenses are arranged in both of a horizontal direction and a vertical direction; and
the ring-shaped electrodes of neighboring SPP LC lenses overlap with each other.

7. The system according to claim 4, wherein:
the ring-shaped electrodes of neighboring SPP LC lenses are arranged in a non-overlapping configuration, and
an electric field of an area between the neighboring SPP LC lenses is adjustable to preserve the phase profile of at least one of the neighboring SPP LC lenses.

8. The system according to claim 4, wherein:
the ring-shaped electrodes of neighboring SPP LC lenses are arranged in a non-overlapping configuration, and
the adaptive lens assembly further includes a second-level SPP LC lens disposed in an area between the neighboring SPP LC lenses.

9. The system according to claim 2, wherein:
the plurality of SPP LC lenses include two SPP LC lenses stacked together, with a same configuration and opposite alignment directions.

10. The system according to claim 2, wherein the controller is configured to:
determine, based on the vergence information, the one or more of the plurality of adjustable LC lenses to be selectively activated;
determine a number of the plurality of SPP LC lenses within the one or more of the plurality of adjustable LC lenses to provide a predetermined optical power of the one or more of the plurality of adjustable LC lenses; and
activate the number of the plurality of SPP LC lenses.

11. The system according to claim 10, wherein, to determine the one or more of the plurality of adjustable LC lenses to be selectively activated, the controller is further configured to:
determine gaze lines of the user; and
determine, among the plurality of the adjustable LC lenses from the array, one or more of the plurality of adjustable LC lenses intersecting with the gaze lines as the one or more of the plurality of adjustable LC lenses to be selectively activated.

12. The system according to claim 10, wherein the lens center shift and the image shift are along directions parallel to the electronic display.

13. A varifocal system, comprising:
an eye tracking device including a sensor configured to obtain eye tracking information for determining a vergence of a user; and
a varifocal block including an adaptive lens assembly having a plurality of adjustable liquid crystal (LC) lenses arranged in an array, wherein the varifocal block is configured to:
selectively activate one or more of the plurality of adjustable LC lenses to adjust a focal length of the varifocal block to reduce a determined discrepancy between the vergence and an accommodation associated with the vergence;
determine a lens center shift between a center of the selectively activated one or more of the plurality of adjustable LC lenses and a center of the adaptive lens assembly;
determine an image shift based on the lens center shift; and
cause an electronic display to shift a virtual image displayed thereon by the image shift.

14. The varifocal system according to claim 13, wherein at least one of the adjustable LC lenses includes a plurality of segmented phase profile (SPP) LC lenses stacked together, and the varifocal block includes layers of array of SPP LC lenses.

15. The varifocal system according to claim 14, wherein:
the plurality of SPP LC lenses include two SPP LC lenses stacked together, with a same configuration and opposite alignment directions.

16. The varifocal system according to claim 14, wherein at least one of the SPP LC lenses is a refractive Fresnel LC lens including a plurality of concentric ring-shaped Fresnel segments of increasing radii.

17. The varifocal system according to claim 16, wherein:
the at least one of the SPP LC lenses includes a plurality of ring-shaped electrodes corresponding to the concentric ring-shaped Fresnel segments,
the ring-shaped electrodes are concentric with an identical area,
a phase difference between adjacent electrodes is the same, and
a phase profile of the at least one of the SPP LC lenses is a parabolic phase profile.

18. The varifocal system according to claim 17, wherein:
the at least one of the SPP LC lenses further includes a plurality of floating electrodes which are discrete and concentric ring-shaped electrodes; and
the floating electrodes are capacitively coupled to the ring-shaped electrodes by an insulating layer, and at least one of the floating electrodes covers a portion of each of neighboring ring-shaped electrodes.

19. The varifocal system according to claim 17, wherein:
within a same layer of array of SPP LC lenses, the plurality of SPP LC lenses are arranged in both of a horizontal direction and a vertical direction; and
the ring-shaped electrodes of neighboring SPP LC lenses overlap with each other.

20. The varifocal system according to claim 17, wherein:
the ring-shaped electrodes of neighboring SPP LC lenses are arranged in a non-overlapping configuration, and the varifocal block further includes a second-level SPP LC lens disposed in an area between the neighboring SPP LC lenses.

\* \* \* \* \*